Nov. 12, 1940.    J. H. TOBLER    2,221,064
BALL TYPE DETACHABLE COUPLING
Filed Jan. 6, 1939    2 Sheets-Sheet 1

Inventor
John H. Tobler
By Mawhinney & Mawhinney
Attorneys.

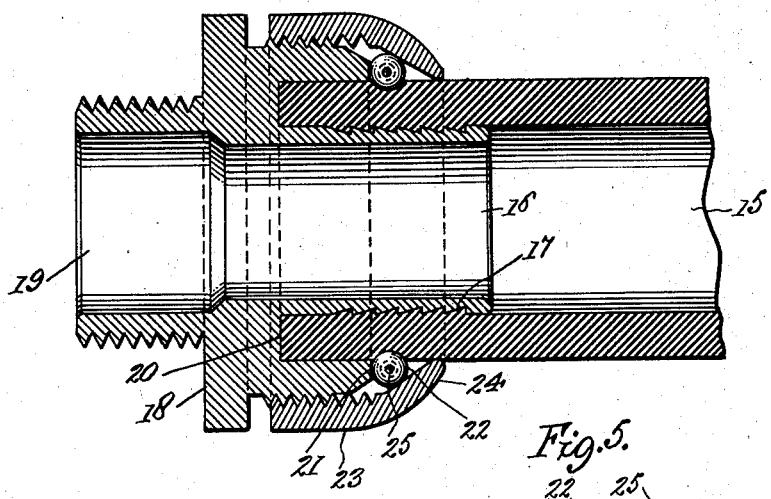
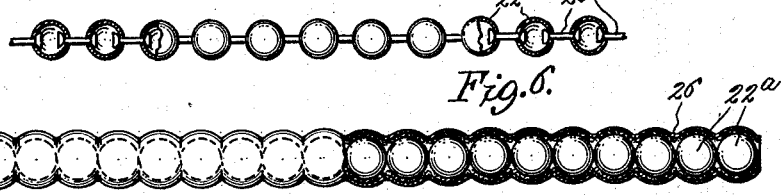
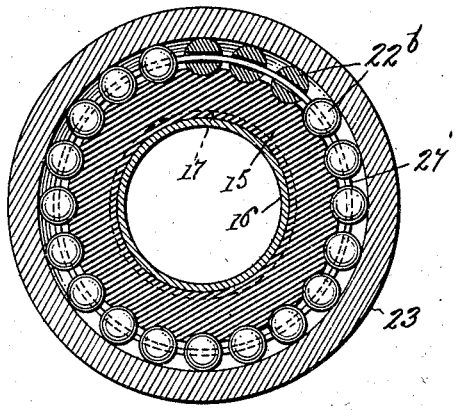
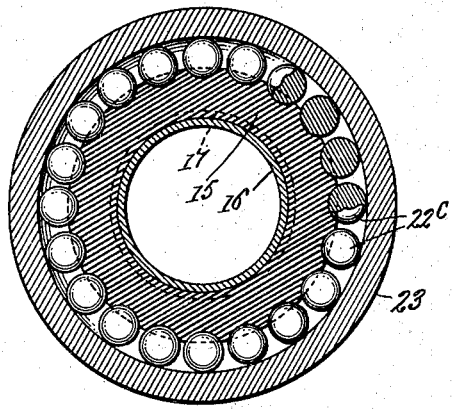

Patented Nov. 12, 1940

2,221,064

UNITED STATES PATENT OFFICE 2,221,064

BALL TYPE DETACHABLE COUPLING

John H. Tobler, Waterbury, Conn., assignor to Scovill Manufacturing Company, Waterbury, Conn., a corporation of Connecticut Application January 6, 1939, Serial No. 249,642

4 Claims. (Cl. 285—86)

The present invention relates to hose couplings of the detachable type, and has for an object to provide a coupling using balls for the gripping elements.

Another object of the invention is to provide a hose coupling with a plurality of relatively small gripping elements for engagement about the hose and which are embedded in the surface portion of the hose and present rounded surfaces in all directions so that the elements, under pressure of the coupling, may be individually seated and embedded in the hose material and may move relatively circumferentially of the hose to effect a firm grip upon the hose and contract and seal it on the supporting nipple in the hose.

Another object of the invention is to provide a coupling having a contractible ball race in which balls may be placed, and may circumferentially shift for settling about the hose, so that when the ball race is contracted the balls will be urged inwardly and compressed into the outer surface portion of the hose to provide a large number of points of contact with the hose which evenly grip the hose at all sides.

A further object of this invention is to provide gripping elements in the form of balls, which present rounded surfaces at all points and prevent cutting and pinching of the hose material, and which may relatively shift during compression to compensate for inequalities in the density, structure and texture of the hose material for gripping the hose without damage thereto and in an efficient manner.

Another object of the invention is to provide novel means for cooperating with the coupling members to maintain the ball gripping elements in assembled relation as a unit for easy handling in fitting the coupling to a hose, and also to prevent loss of the balls in handling and insure proper spacing of the balls in the coupling and about the hose.

With the foregoing and other objects in view, the invention will be more fully described hereinafter, and will be more particularly pointed out in the claims appended hereto.

In the drawings, wherein like symbols refer to like or corresponding parts throughout the several views:

Figure 3 is a like view but with the coupling in clamping or gripping position on the hose.

Figure 5 is a detail fragmentary view, partly in section, of the gripping balls of Figures 1 to 4 showing the bar links connecting the balls in chain form.

Figure 6 shows a modified form of a string of balls wherein the latter are held in chain form by a flexible casing.

Figure 7 is a transverse section taken through the coupling on the line 4—4 of Figure 1, showing another modified form of the holding means for the balls for retaining them together as a unit, and Figure 8 is a like view, but showing the balls as independent elements.

Figure 1:
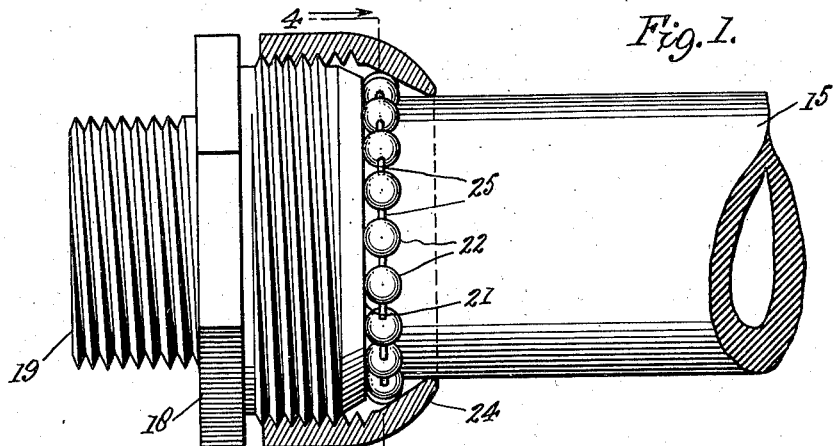
Figure 1 is a side elevation, partly broken away, of a hose coupling embodying the features of this invention and secured on the end of a hose.

Referring now to the drawings, one embodiment of the coupling is shown in Figures 1 to 5 wherein 15 designates the end of a hose to which the coupling is secured.

Figure 2:
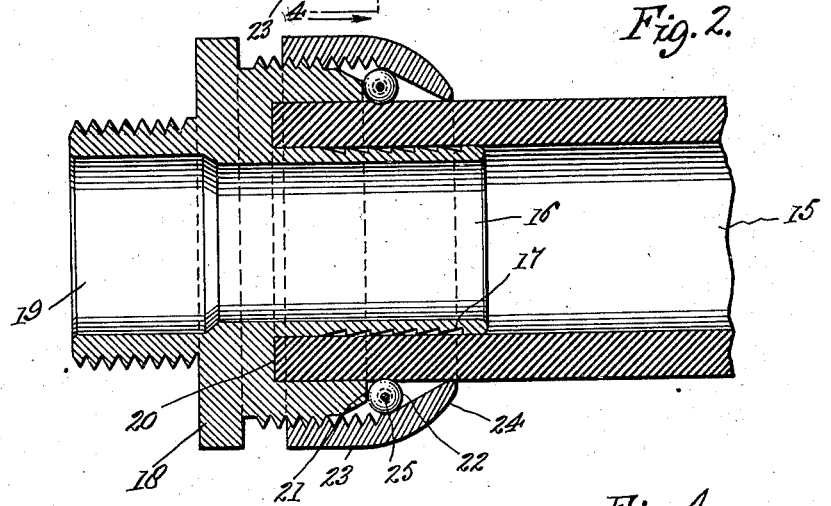
Figure 2 is a longitudinal section taken through the coupling and the hose thereon with the parts in place and ready to be turned up into hose gripping position.
Figure 4:
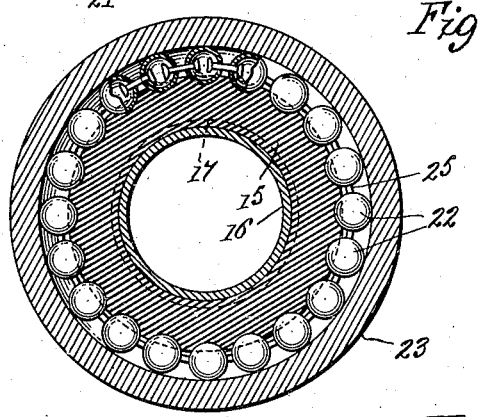
Figure 4 is a transverse section taken on the line 4—4 of Figure 1, showing the balls compressed into the hose material.

In Figure 2 the hoe 15 is fitted at its open end over a nipple 16 which may have retaining teeth 17 in its outer surface adapted, as shown in Figure 3, to engage in the inner wall of the hose to hold the latter from pulling off of the nipple. The nipple 16 is carried on the body portion or nut 18 of the coupling. When the coupling is used with a hose having a reinforcing metallic lining this nipple 16 is not necessary as the metallic lining has sufficient resistance to hold the hose against collapsing when subjected to the pressure of the contracting balls of the coupling. The nut 18 is provided with a suitable coupling part 19 for engagement with a complemental coupling part for connecting the hose 15 to a nozzle, to a second hose, or to any other desired device.

The body of the nut 18 is enlarged about the end of the nipple 16 and provides a shoulder 20 for abutting the extremity of the hose 15, and from the outer margin of the shoulder 20 the nut extends over the nipple 16 in spaced relation thereabout to embrace the hose end 15 and provide an annular pocket for the hose. The overhanging or extended portion of the nut 18 is externally screw threaded and terminates in an annular ball seat 21 which is of any suitable contour, such as flat in a transverse plane as shown. This threaded extension of the nut 18 extends over the nipple 16 a distance slightly less than one half of the length of the nipple and receives against its ball seat 21 an annular row of balls 22 which are held about the hose 15 in a transverse plane intersecting the nipple midway of its ends so that when the balls 22 are contracted about the hose 15, the latter will have a firm support on the nipple and will be compressed thereabout into interlocking and sealed engagement therewith.

An internally threaded sleeve 23 is threaded over the nut 18 and has a tapering extension 24 which engages over balls 22 and beyond the same, the reduced end of the extension 24 preferably contacting with the outer surface of the hose 15. This sleeve 23 with its extension 24 provides a cup internally threaded for turning up on the nut 18 and with a tapering bottom adapted to fit about the hose 15 and hold the balls 22 about the hose.

In applying the coupling to the hose 15, the sleeve 23 is first slipped over the end of the hose and, with preferably the hose end 15 and the sleeve cup 23 turned to open upward, the balls 22 are poured, or otherwise placed, in the bottom of the sleeve cup 23 and seek a common level about the hose. The nut 18 is now applied to the hose 15 by forcing the nipple 16 into the open end of the hose until the extremity of the latter abuts the shoulder 20. The outer threaded portion of the nut 18 engages about the hose and encloses it in the annular pocket of the coupling. The sleeve 23 is now threaded upon the nut and advances the balls 22 against the ball seat 21. The parts of the coupling are now in the position shown in Figure 2 and are ready to be tightened or clamped upon the hose 15.

To clamp the coupling on the hose 15 it is only necessary to turn the sleeve 23 up on the nut 18 with sufficient pressure to draw the tapering end 24 of the sleeve over the outer sides of the balls 22. The ball seat 21 holds the balls 22 from axial movement and the tapering end 24, during advancement of the sleeve 23, forces the balls 22 radially inward and compresses the balls into the outer surface portion of the hose 15, as shown in Figure 3. It will be noted that the outer surface portion of the ball seat 21 is tapered or beveled and this construction admits the advancement of the tapered end 24 of the sleeve upwardly of the nut to a desired practical extent for contracting the balls 22 into deep seated engagement in the outer surface portion of the hose 15.

The balls 22 compress the hose 15 upon and about the nipple 16 and force the inner wall of the hose into the toothed surface 17 of the nipple. The balls are rounded in all directions and prevent the cutting, cracking and pinching of the hose material. Furthermore, as the balls 22 are round they individually settle into the hose material and may move circumferentially relative to one another to take care of any inequalities in the resiliency of the hose material or in the cylindrical formation of the hose or any parts of the coupling.

In the structure of the coupling shown, the balls 22 may be of any desired construction, and may or may not be coupled together in chain form. The balls 22 are shown as of hollow or shell construction, Figure 5, interconnected by rod links 25 headed at opposite ends against the inner walls of the balls 22. The balls slide freely on the links 25 and the chain of balls 22 may easily contract and settle about the hose 15 within the sleeve cup 23. The advantage of the ball chain construction is that the desired number of balls for the coupling are always held together and against loss in handling, and may be easily applied to the coupling while assembling the parts thereof on the hose.

Figure 6 shows another manner of connecting the balls in chain formation. In this construction the proper number of balls 22$^a$ are placed in a tubular fabric casing 26. The fabric casing 26, containing the balls 22$^a$ is dipped into hot paraffin and permitted to cool. The fabric casing is thus stiffened to a desired extent, and is shrunk upon the balls to conform to the contour thereof and provides separate and independent pockets for holding the balls in desired spaced relation. The fabric casing with the balls may be easily placed in the bottom of the sleeve cup 23 about the hose 15 and may be compressed in the same manner as shown in Figure 3.

Another way for connecting the balls in assembled or chain formation is shown in Figure 7. Here the balls 22$^b$ have holes through their central portion for receiving a wire 27, or other flexible element, for holding the balls in circular formation and to approximately the size of the race or annular space in the coupling for the balls. The ends of the wire 27 may be soldered together to provide a continuous band or connection admitting of the sliding and shifting of the balls 22$^b$ relative to one another during the contraction of the balls about the hose. The wire 27 is of course sufficiently flexible to admit the movement of the balls under pressure during the tightening of the coupling.

Of course the balls 22$^c$, as shown in Figure 8, may be free and independent of one another. In this instance the proper number of balls for the coupling may be supplied in a package, such as an envelope, and the package may be broken and the balls be poured into the sleeve cup 23 while it is held in place about the hose 15. The balls may be supplied in any manner found practical, either connected together in, or loosely packaged in a group of, the desired number. The balls 22 may be of desired size to adapt them to the particular size of coupling and hose used.

What is claimed is:

1. A ball type detachable hose coupling, comprising a body portion having a nipple adapted to receive the end of a hose thereover and having a sleeve of less length than the nipple and spaced about the nipple for engagement about the outer end portion of the hose when the latter is disposed on the nipple, a nut threaded to the sleeve and having an internal inclined face tapering beyond the end of the sleeve, and a series of balls disposed about the end of the sleeve for encircling the portion of the hose on the nipple at a point spaced from the extremity of the hose, the parts being so constructed and arranged that by the turning up of the nut on the sleeve said inclined face is drawn over the outer side of the balls and cams the balls radially inward against the end of the sleeve into the outer surface portion of the hose to secure the same in the coupling.

2. A detachable hose coupling, comprising a body portion having a sleeve adapted to receive therein the end of a hose with a supported inner wall, a plurality of balls disposed against the end of the sleeve about the supported end of the hose, and a nut threaded on the sleeve and having a tapering inner wall extending over and beyond the balls to force the balls against the end of the sleeve and radially inward into the outer surface portion of the hose when the nut is turned up on the sleeve.

3. A detachable hose coupling, comprising a body portion having a nipple adapted to engage in the end of a hose for supporting the same and having a sleeve spaced about the nipple to engage over the hose end and being of less length than that of the nipple to dispose the end of the sleeve intermediate the ends of the nipple and in spaced relation to the extremity of the hose, a chain of balls disposed about the hose and against the end of the sleeve, and a nut threaded on the sleeve and having a tapering extension extending over and beyond the balls, the sleeve and nut being so constructed and arranged that upon the turning up of the nut on the sleeve said tapering extension forces the balls against the end of the sleeve and cams the balls radially inward into compressed position in the outer surface portion of the hose.

4. A detachable hose coupling, comprising a body portion for receiving the end of a hose with a supported inner wall and having a sleeve adapted to engage over the hose end and provided with an annular ball receiving surface extending around the hose, a nut threaded to the sleeve and having an annular ball receiving surface opposed to said first named surface on said sleeve, at least one of said ball receiving surfaces being beveled inwardly, and a series of balls disposed about the hose between said surfaces, the sleeve and nut being so constructed and arranged that upon the turning up of the nut on the sleeve the balls are forced inwardly into the outer surface portion of the hose to grip and seal the same in the coupling body.

JOHN H. TOBLER.